Nov. 10, 1936.   H. S. HINKSON   2,060,077
AIRCRAFT
Filed July 2, 1934
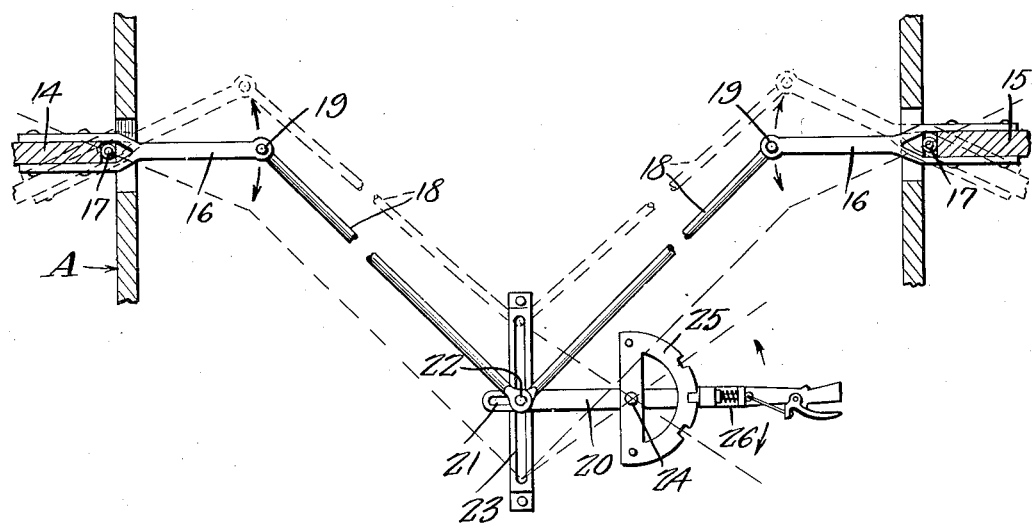
Holman S. Hinkson,
INVENTOR
BY Victor J. Evans & Co.
ATTORNEY
WITNESS: P. J. Hickey Patented Nov. 10, 1936

2,060,077

UNITED STATES PATENT OFFICE 2,060,077

AIRCRAFT

Holman Stanley Hinkson, Lacytown, Georgetown Demerara, British Guiana

Application July 2, 1934, Serial No. 733,485

1 Claim. (Cl. 244—29)

The invention relates to aircraft control and more especially to a rudder control for helicopter-acting flying machines or airships.

An object of the invention is the provision of a control for aircraft of this character, wherein the craft when in flight will travel in a diagonal and in a horizontal line, this being had by fore and aft rudders operating in unison with each other.

A still further object of the invention is the provision of a rudder control of this character which is comparatively simple in its construction, thoroughly reliable and efficient in its operation, readily and easily handled for ascent and descent, as well as when in flight, and inexpensive to manufacture.

With these and other objects in view, the invention consists in the features of construction, combination and arrangement of parts as will be hereinafter more fully described in detail, illustrated in the accompanying drawing, which discloses the preferred embodiment of the invention, and pointed out in the claim hereunto appended.

In the accompanying drawing:

The figure is a fragmentary horizontal sectional view through a fuselage of an aircraft showing in detail the rudder control constructed in accordance with the invention.

Similar reference characters indicate corresponding parts throughout the several views in the drawing.

Referring to the drawing in detail, a portion of a body or fuselage of an aircraft is designated generally at A and the same is of any desired configuration and is provided with a head rudder 14 and a tail rudder 15, respectively.

The head rudder 14 and tail rudder 15 are laterally shiftable and constitute rudders fore and aft of the body or fuselage A, each being carried by a swinging arm 16, pivoted at 17, at the longitudinal median of said body or fuselage. These arms 16, through links 18 pivoted thereto at 19, are reversely shiftable in unison by a throw lever 20 having a slot 21 receiving a pivot pin 22 common to the links 18 and movable in a guide 23 in the form of a slotted bracket mounted within the body or fuselage. The throw lever 20 is pivoted, at 24, to a keeper sector 25 stationarily supported and with which engages a hand-released latch 26 carried by said lever, so that it may be locked or latched in shifted position and thus holding the rudders constituted by the head 14 and tail 15 in their thrown position for the steering of the craft. This throw lever 20 is in convenient reach of an operator within the body or fuselage A which carries windows 27 for observation purposes, access being had to the said body or fuselage in any approved manner.

The aircraft can travel in flight diagonally or in a horizontal course, its direction of flight being had and maintained by the fore and aft rudders.

What is claimed is:

The combination with a fuselage of an aircraft, of laterally swinging rudders arranged fore and aft of the fuselage, bifurcated arms extending outwardly through said fuselage from the interior and straddling the rudders for fastening therewith, connections between the fuselage and said rudders for swinging movement of the latter, a stationary slotted guide located within the fuselage, a pivot engaging the slotted guide and movable in its slot, links pivoted to the said pivot and also pivotally connected to the bifurcated arms, a stationary keeper segment located adjacent to the guide, an operating lever pivoted to the segment and having a slotted end accommodating the pivot working in the guide, and means on the lever for latching engagement with the segment to hold the lever in adjusted position.

HOLMAN STANLEY HINKSON.